United States Patent [19]

Ito et al.

[11] Patent Number: 4,468,508

[45] Date of Patent: Aug. 28, 1984

[54] GLYCIDYL ETHER OF NOVOLAK TYPE SUBSTITUTED PHENOLIC RESIN, PROCESS FOR PRODUCING THE SAME, AND ENCAPSULATING COMPOUND COMPOSED MAINLY OF THE SAME

[75] Inventors: Iko Ito; Yoshiki Toyoshima; Tsutomu Takahashi; Noriaki Saito, all of Ehime, Japan

[73] Assignee: Sumitomo Chemical Company, Limited, Osaka, Japan

[21] Appl. No.: 524,630

[22] Filed: Aug. 19, 1983

[30] Foreign Application Priority Data

Aug. 20, 1982 [JP] Japan ................................ 57-145316

[51] Int. Cl.$^3$ ............................................. C08G 59/08
[52] U.S. Cl. ................................ 525/507; 264/331.22; 525/481
[58] Field of Search ................................ 525/507, 481

[56] References Cited

U.S. PATENT DOCUMENTS

| | | | |
|---|---|---|---|
| 3,252,850 | 5/1966 | Partansky | 525/507 X |
| 3,278,637 | 10/1966 | Kirkpatrick et al. | 525/507 X |
| 3,280,216 | 10/1966 | Partansky | 525/507 X |
| 3,283,030 | 11/1966 | Bean, Jr. et al. | 525/507 X |
| 3,859,379 | 1/1975 | Kitamura et al. | 525/507 X |
| 4,102,866 | 7/1978 | Speranza et al. | 525/507 |
| 4,342,852 | 8/1982 | Takeda et al. | 525/481 |
| 4,345,054 | 8/1982 | Takeda et al. | 525/481 X |
| 4,403,077 | 9/1983 | Uhrig et al. | 525/507 X |
| 4,403,079 | 9/1983 | Uhrig et al. | 525/507 |
| 4,431,565 | 2/1984 | Billenstein et al. | 525/507 X |

*Primary Examiner*—Howard E. Schain
*Attorney, Agent, or Firm*—Sughrue, Mion, Zinn, Macpeak and Seas

[57] ABSTRACT

A new glycidyl ether of novolak type substituted phenolic resin composed of specific repeating units and new terminal groups contained therein. This resin is superior as an encapsulating compound in the electric and electronic industries.

15 Claims, 2 Drawing Figures

GLYCIDYL ETHER OF NOVOLAK TYPE SUBSTITUTED PHENOLIC RESIN, PROCESS FOR PRODUCING THE SAME, AND ENCAPSULATING COMPOUND COMPOSED MAINLY OF THE SAME

The present invention relates to a new glycidyl ether of novolak type substituted phenolic resin. More particularly, it relates to a new glycidyl ether of novolak type substituted phenolic resin which is superior as a raw material in the electric and electronic industries on account of the specific repeating units and new terminal groups contained therein.

Glycidyl ether of novolak type phenolic resin is used as a raw material in the electric and electronic industries. It is particularly important as a raw material of encapsulating compound for semiconductor integrated circuits. The glycidyl ether of novolak type phenolic resin which is mainly used for this application includes glycidyl ether of o-cresol novolak and glycidyl ether of phenol novolak, and the former is predominant. The glycidyl ether of novolak type phenolic resin used in this application is required to contain as little hydrolyzable chlorine as possible, and the molded items produced from it after incorporation with a curing agent and inorganic filler are required to have as low hygroscopicity and internal stress as possible. However, the glycidyl ether of o-cresol novolak and glycidyl ether of phenol novolak have become unsatisfactory with the advent of large-scale integrated circuits.

In order to develop a new glycidyl ether of novolak type phenolic resin which will meet the above-mentioned requirements when used for large-scale integrated circuits, the present inventors carried out a series of researches. As the result, it was found that the requirements are met by a glycidyl ether of novolak type substituted phenolic resin of such a structure that the ortho position and para position with respect to the phenolic hydroxyl group are substituted with specific substituent groups or connected with the adjacent phenol unit through a methylene group. The present invention is based on these findings.

It is an object of this invention to provide a new glycidyl ether of novolak type substituted phenolic resin having 1 to 40 repeating units on the number-average which comprises a substantially linear polymer composed of the repeating units represented by the formula (I):

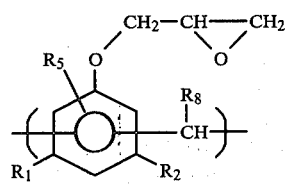

substantially all the chain terminals of the molecules of said polymer being modified with a group represented by the formula (II):

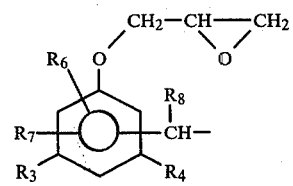

wherein $R_1$, $R_2$, $R_3$ and $R_4$, which may be the same or different, are members selected from the group consisting of hydrogen atom, alkyl groups having 1 to 8 carbon atoms, aromatic group, and halogen atom; $R_5$, $R_6$ and $R_7$, which may be the same of different, are members selected from the group consisting of alkyl groups having 1 to 10 carbon atoms, aromatic group, aryl group, and halogen atom; and $R_8$ is a member selected from the group consisting of hydrogen atom and alkyl groups having 1 to 4 carbon atoms.

Figure 1:
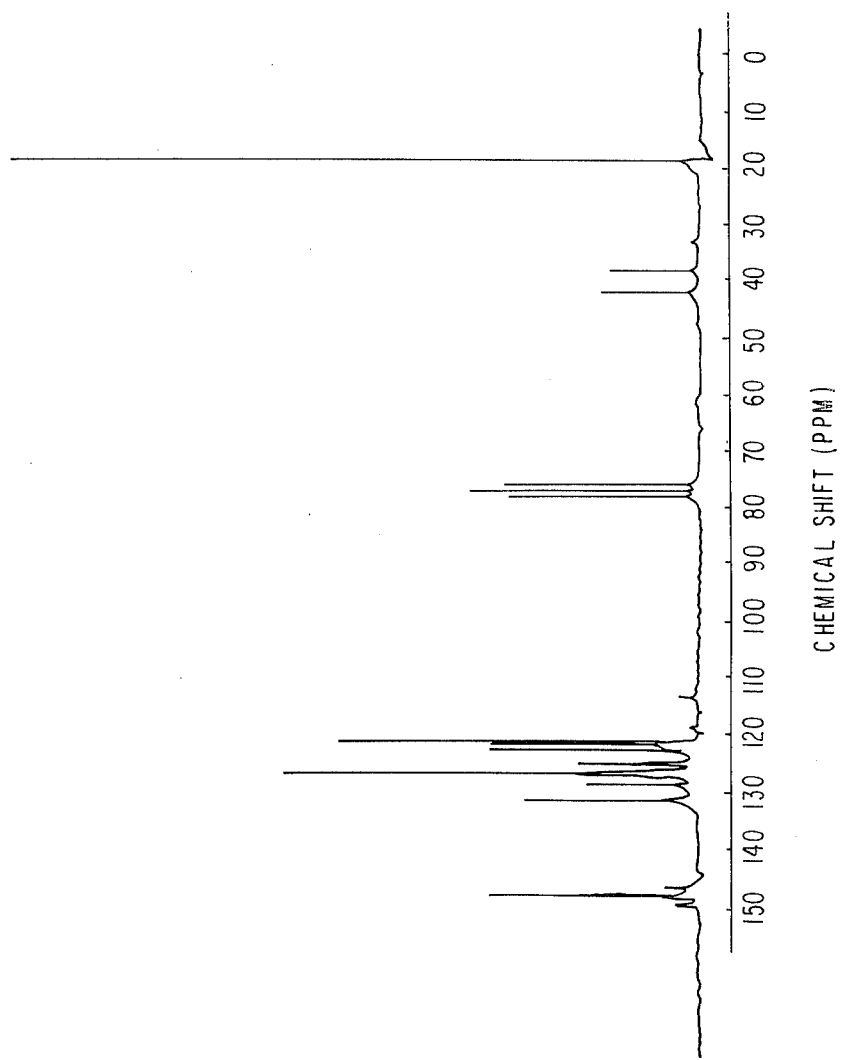
FIG. 1 is a $^{13}$C-NMR spectrum of novolak type substituted phenolic resin obtained in Example 1-(1).

The new glycidyl ether of novolak type substituted phenolic resin of this invention is characterized by its structure that the ortho position and para position with respect to the phenolic hydroxyl group are substantially all substituted or connected with the adjacent aromatic ring through a methylene group. In the case of a glycidyl ether of conventional known o-cresol novolak, the chain terminal of the molecule has such a structure that the ortho position or para position with respect to the glycidyl ether group has a hydrogen atom.

Because of the above-mentioned structural feature, the new glycidyl ether of novolak type substituted phenolic resin of this invention is advantageous over the glycidyl ether of o-cresol novolak or glycidyl ether of phenol novolak in that the content of hydrolyzable chlorine is low. Moreover, because of the introduction of the substituted groups, the internal stress caused by shrinkage of resin is released in the cured moldings prepared by incorporating a curing agent, filler, etc. In the case where the substituted groups are hydrophobic, the resulting moldings are less hygroscopic. These features satisfy the performance required for the above-mentioned raw materials for the electric and electronic industries. These features make the new glycidyl ether of this invention useful.

The glycidyl ether of novolak type substituted phenolic resin of this invention will be described in more detail.

The glycidyl ether of novolak type substituted phenolic resin of this invention is a glycidyl ether of novolak type substituted phenolic resin having 1 to 40 repeating units on the number-average which comprises a substantially linear polymer composed of the repeating units represented by the formula (I):

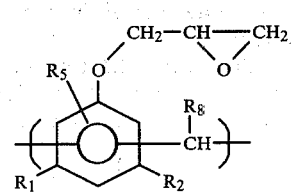

substantially all the chain terminals of the molecules of said polymer being modified with a group represented by the formula (II):

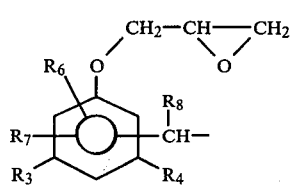

wherein $R_1$, $R_2$, $R_3$ and $R_4$, which may be the same or different, are members selected from the group consisting of hydrogen atom, alkyl groups having 1 to 8 carbon atoms, aromatic group, and halogen atom; $R_5$, $R_6$ and $R_7$, which may be the same or different, are members selected from the group consisting of alkyl groups having 1 to 10 carbon atoms, aromatic group, aryl group, and halogen atom; and $R_8$ is a member selected from the group consisting of hydrogen atom and alkyl groups having 1 to 4 carbon atoms.

The substituent groups $R_1$, $R_2$, $R_3$ and $R_4$ include, for example, hydrogen atom, methyl group, ethyl group, phenyl group, benzyl group, chlorine atom, bromine atom, and iodine atom. Preferable among them are hydrogen atom, methyl group, chlorine atom, and bromine atom; and more preferable among them are hydrogen atom, methyl group, and bromine atom. The scope of this invention is not limited to them.

The substituent groups $R_5$, $R_6$ and $R_7$ include, for example, methyl group, ethyl group, n-butyl group, t-butyl group, pentyl group, hexyl group, nonyl group, phenol group, benzyl group, propenyl group, chlorine atom, bromine atom, and iodine atom. Preferable among them are methyl group, t-butyl group, nonyl group, phenol group, propenyl group, chlorine atom, and bromine atom. More preferable among them are methyl group, t-butyl group, phenyl group, and bromine atom. The scope of this invention is not limited to them.

The substituent group $R_8$ includes, for example, hydrogen atom, methyl group, ethyl group, and propyl group. Preferable among them is hydrogen atom. The scope of this invention is not limited to them.

The glycidyl ether of novolak type substituted phenolic resin of this invention has 1 to 40, preferably 2 to 20, repeating units on the number-average. If the number of the repeating units is in excess of 40, polymeric constituents are formed in large quantity, and the resulting glycidyl ether is too viscous to handle even at a high temperature. On the other hand, if the number of the repeating units is smaller than 1, the resulting glycidyl ether is a semisolid or viscous liquid at normal temperature and is difficult to handle. The number-average molecular weight is about 500 to 8000. The number-average molecular weight is determined by the vapor pressure method and osmotic pressure method, and it is used to calculate the number of the repeating units on the number-average.

The glycidyl ether of novolak type substituted phenolic resin of this invention can be produced by polycondensing a phenol component (as defined below) and an aldehyde (as defined below) to form a novolak type substituted phenolic resin and subsequently glycidyl etherifying the resin with an epihalohydrin.

Phenol component: composed of 30 to 95 mol% of at least one difunctional phenol represented by the formula (III):

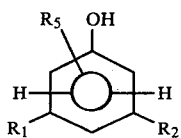

and 5 to 70 mol% of at least one monofunctional phenol represented by the formula (IV):

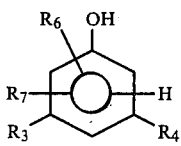

(where $R_1$ to $R_7$ are defined as above), provided that the total of the two types of phenols is 100 mol%.

Aldehyde: represented by the formula (V):

$$R_8CHO \qquad (V)$$

(where $R_8$ is defined as above.)

Examples of the difunctional phenol include p-propenylphenol, o-benzylphenol, 6-n-amyl-m-cresol, o-cresol, p-cresol, o-ethylphenol, p-ethylphenol, p-phenylphenol, p-t-pentylphenol, p-t-butylphenol, o-chlorophenol, 4-chloro-3,5-xylenol, o-allylphenol, nonylphenol, and o-bromophenol. The scope of this invention is not limited to them.

Examples of the monofunctional phenol include 2-t-butyl-4-methylphenol, 2,4-xylenol, 2,6-xylenol, 2,4-dichlorophenol, 2,4-dibromophenol, dichloroxylenol, dibromoxylenol, 2,4,5-trichlorophenol, and 6-phenyl-2-chlorophenol. The scope of this invention is not limited to them.

The monofunctional phenol and the difunctional phenol are combined at the ratio of 5 to 70 mol% to 95 to 30 mol% (the sum of the two components being 100 mol%). If the monofunctional phenol is less than 5 mol%, the resulting glycidyl ether of novolak type substituted phenolic resin increases in molecular weight to such an extent that handling is difficult. On the other hand, if the monofunctional phenol is in excess of 70 mol%, it forms low-molecular weight substances including dimers. The low-molecular weight substances make the resulting glycidyl ether of novolak type phenolic resin semisolid or viscous liquid at normal temperature. This is not desirable from the standpoint of handling and processing when it is used as a raw material for the electric and electronic industries.

Examples of the aldehyde include formaldehyde, paraformaldehyde, polyoxymethylene, and glyoxal.

Examples of the epihalohydrin include epichlorohydrin and epibromohydrin. The former is preferable from the standpoint of commercial availability.

The monofunctional phenol and the difunctional phenol are polycondensed with the aldehyde to form a novolak type substituted phenolic resin by the conventional method for producing novolak type phenolic resins. The polycondensation may be accomplished batchwise or continuously as disclosed in Japanese Patent Laid-open No. 130498/1976. According to one method described in *Encyclopedia of Polymer Science*

*and Technology* (published by Interscience Publishers) Vol. 10, Page 1, Section of Phenolic Resins, phenols and aldehydes are polycondensed using as a catalyst an inorganic acid such as hydrochloric acid, phosphoric acid, and sulfuric acid; an organic acid such as p-toluenesulfonic acid, and oxalic acid; or a metal salt such as zinc acetate. According to this invention, at least one monofunctional phenol and at least one difunctional phenol are used in combination. They may be mixed prior to reaction, or the difunctional phenol may be polycondensed with an aldehyde at first and then the monofunctional phenol may be added.

The novolak type substituted phenolic resin thus prepared is new like a glycidyl ether of the phenolic resin. It is a substantially linear polymer composed of 1 to 40 repeating units on the number-average represented by the formula (VI):

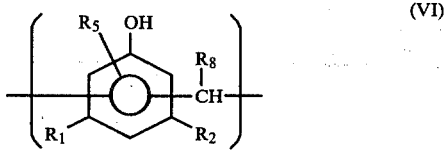

substantially all the chain terminals of the molecules of said polymer being modified with a group represented by the formula (VII):

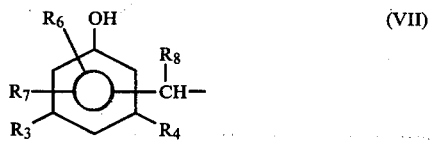

wherein $R_1$, $R_2$, $R_3$ and $R_4$, which may be the same or different, are members selected from the group consisting of hydrogen atom, alkyl groups having 1 to 8 carbon atoms, aromatic group, and halogen atom; $R_5$, $R_6$ and $R_7$, which may be the same or different, are members selected from the group consisting of alkyl groups having 1 to 10 carbon atoms, aromatic group, aryl group, and halogen atom; and $R_8$ is a member selected from the group consisting of hydrogen atom and alkyl groups having 1 to 4 carbon atoms.

The novolak type substituted phenolic resin is glycidyl etherified by the common method for producing a glycidyl ether from a monohydric or polyhydric phenol. According to the common method, a polyhydric phenol is dissolved in epichlorohydrin, and an aqueous solution of alkali metal hydroxide is continuously added to this solution, during which water and epichlorohydrin are distilled away and epichlorohydrin separated from the distillate is recycled to the reaction system. When the polyhydric phenol is replaced by the novolak type substituted phenolic resin, the glycidyl ether of this invention can be produced. Incidentally, this reaction can also be carried out in the presence of a cyclic or linear ether such as dioxane and diethoxyethane. The scope of this invention is not limited to them.

The glycidyl ether of novolak type substituted phenolic resin of this invention may be incorporated with a curing agent such as phenol novolak, diaminodiphenylmethane, diaminodiphenylsulfone, m-phenylenediamine, phthalic anhydride, tetrahydrophthalic anhydride, pyromellitic dianhydride, and benzophenonetetracarboxylic anhydride; an inorganic filler such as silica, alumina, talc, clay, and glass fiber; an accelerator such as imidazoles, tertiary amines, and phenols; an internal mold lubricant such as stearic acid, calcium stearate, carnauba wax, and montan wax, and, if desired, a flame-retardant such as glycidyl ether of tetrabromobisphenol. The compound thus prepared will find use in the electric and electronic industries; it is particularly useful as an encapsulating compound for integrated circuits. The formulation for curing agent, filler, accelerator, and internal mold lubricant varies according to their kinds. In general, a curing agent may be incorporated in such an amount that the mole number of the functional group in the curing agent is equal to the mole number of the epoxy group in the glycidyl ether of novolak type substituted phenolic resin. A filler may be incorporated in such an amount that the filler establishes the closest packing in the total volume of formulation. An accelerator may be incorporated in a catalytic amount. An internal mold lubricant may be incorporated in an amount of about 0.2 to 2.0 wt% of the total formulation.

The invention is now described in more detail with reference to the following nonlimitative examples. The epoxy equivalent as used in this invention is defined by the gram equivalent per mole of glycidyl ether group. The hydrolyzable chlorine is defined by weight percentage of chlorine atom determined as follows: Glycidyl ether of novolak type substituted phenolic resin is dissolved in dioxane. An alcoholic solution of potassium hydroxide is added to the dioxane solution. The solution is heated for 30 minutes under reflux. The eliminated chlorine ion is determined by back titration with a solution of silver nitrate.

EXAMPLE 1

(1) Synthesis of novolak type substituted phenolic resin

In a 500-cc flask equipped with a thermometer, cooling tube, dropping funnel, and stirrer were placed 0.6 mol of o-cresol, 0.4 mol of 2,6-xylenol, and 0.015 mol of p-toluenesulfonic acid as a catalyst. The reactants were dissolved and mixed at 100° C. Subsequently, 37% aqueous solution of formalin (containing 0.8 mol of formaldehyde) was added dropwise through the dropping funnel over 3 hours. The flask was kept at 98° C. for 2 hours. The p-toluenesulfonic acid was neutralized with 5% aqueous solution of NaOH. Separated water was removed and remaining water and unreacted substances were removed by distillation. Thus there was obtained a yellowish resin which is solid at normal temperature. This resin was found to have a softening point of 92° C. and a density of 1.18 g/cm³. Softening point was measured according JIS K-2531 (Ring and ball method for measuring softening point of petroleum asphalt).

The $^{13}$C-NMR of this resin was measured using deuterochloroform as the solvent. The results are shown in FIG. 1. The chemical shift value of the phenol at the terminal of the molecular chain is 115 ppm or 120 ppm when the hydrogen is connected to the carbon at the ortho position or para position with respect to the phenolic hydroxyl group, respectively. In the case of the thus obtained novolak type substituted phenolic resin, no absorption is observed at the chemical shift of 120 ppm, and a slight absorption is obserbed at the chemical shift of 115 ppm. This result indicates that the terminal of the molecular chain is almost all 2,6-xylenol. In other words, almost all the carbon atoms at the ortho position and the para position with respect to the hydroxyl group of the phenol are connected to adjacent phenols through a methylene group or connected to methyl groups.

Figure 2:
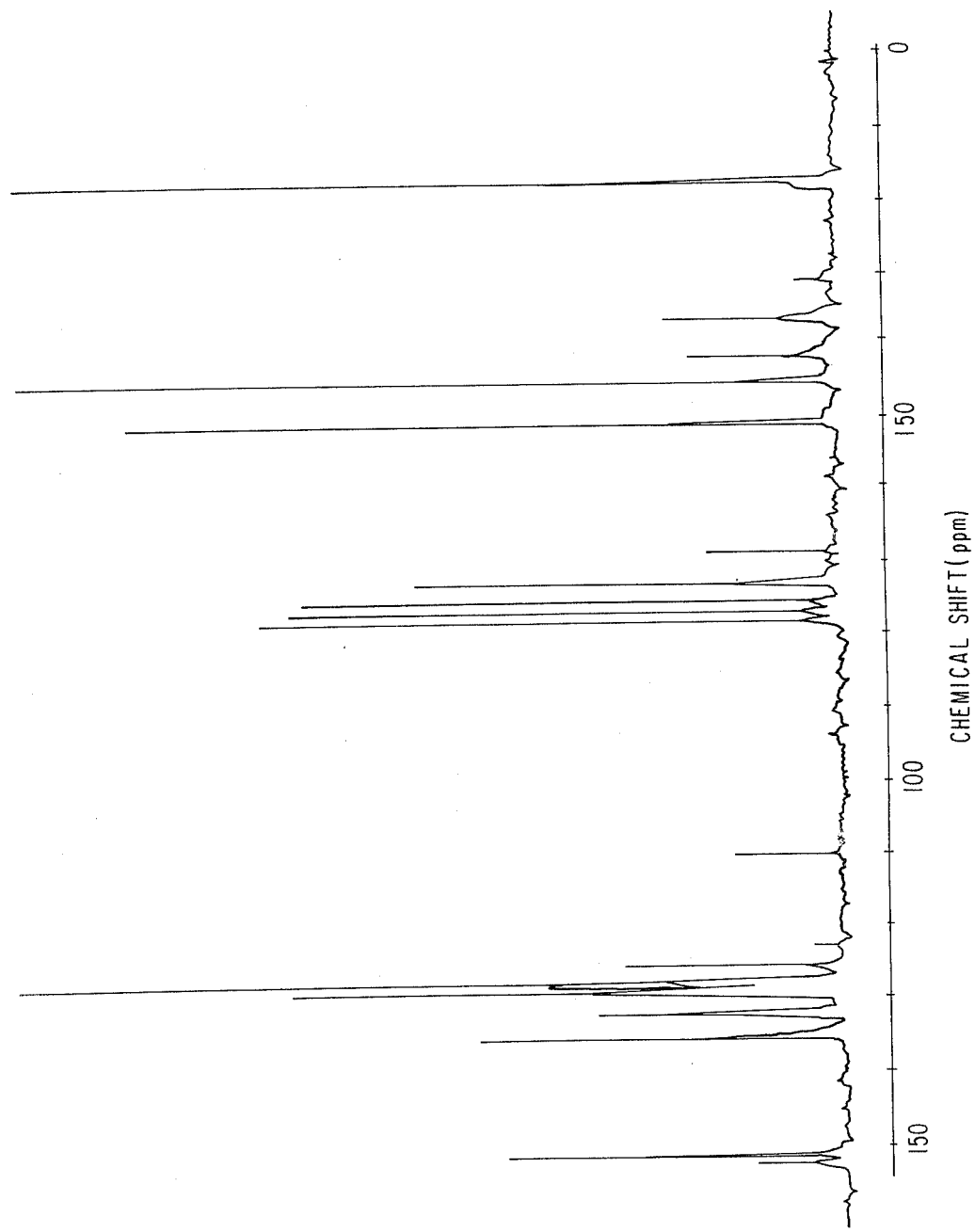
FIG. 2 is a $^{13}$C-NMR spectrum of glycidyl ether of novolak type substituted phenolic resin obtained in Example 2-(2).

(2) Synthesis of glycidyl ether of novolak type substituted phenolic resin 1.0 mol (in terms of phenolic hydroxyl group) of the novolak type substituted phenolic resin obtained in the above step (1) was dissolved in 6.0 mols of epichlorohydrin in a 1-liter flask equipped with a thermometer, separating tube, dropping funnel, and stirrer. 48% NaOH (1.05 mols as NaOH) was added dropwise over 6 hours. During this time epichlorohydrin and water were azeotropically boiled at 66° C. under reduced pressure (150 mmHg) and cooled by the separating tube, whereby the epichlorohydrin layer was returned to the reaction system whereas the water layer was discharged from the reaction system. After the reaction was completed, the epichlorohydrin was distilled away and the reaction product was dissolved in toluene. The salt formed as a by-product was filtered out, and then toluene was distilled away. Thus there was obtained a glycidyl ether of the novolak type substituted phenolic resin. This glycidyl ether was found to contain 500 ppm of hydrolyzable chlorine and to have an epoxy equivalent of 200, a softening point of 61° C., and a density of 1.19 g/cm³. The ¹³C-NMR of this glycidyl ether was also measured in the same way as in step (1). The results are shown in FIG. 2.

COMPARATIVE EXAMPLE 1

Novolak type substituted phenolic resin was synthesized in the same way as in Example 1 except that 2,6-xylenol was replaced by 1.0 mol of o-cresol. Then a glycidyl ether of the phenolic resin was synthesized in the same way as in Example 1. The ¹³C-NMR of the phenolic resin gave absorption at 115 ppm and 120 ppm. This absorption intensity (regarded as 100%) was compared with the absorption intensity of the novolak type substituted phenolic resins obtained in Examples 1 to 5. The results are shown in Table 1. Also shown in Table 1 are the softening point and density of each phenolic resin and the epoxy equivalent, hydrolyzable chlorine, softening point, and density of the glycidyl ether of each phenolic resin.

EXAMPLES 2 TO 5

Novolak type substituted phenolic resins were synthesized in the same way as in Example 1 except that a monofunctional phenol and a difunctional phenol as shown in Table 1 were used. Then glycidyl ethers of the phenolic resins were synthesized in the same way as in Example 1. The results are shown in Table 1.

It is noted from Table 1 that the glycidyl ethers of the novolak type substituted phenolic resins obtained in these Examples contain a less amount of hydrolyzable chlorine as compared with that obtained in Comparative Example 1.

TABLE 1

| | Phenols | | Novolak type substituted phenolic resin | | | | Glycidyl ether of novolak type substituted phenolic resin | | | |
|---|---|---|---|---|---|---|---|---|---|---|
| Example No. | Difunctional phenol (mol) | Monofunctional phenol (mol) | Ortho-position (115 ppm) | Para-position (120 ppm) | Softening point (°C.) | Density (g/cm³) | Epoxy equivalent | Hydrolyzable chlorine (wt %) | Softening point (°C.) | Density (g/cm³) |
| 1 | o-cresol (0.6) | 2,6-xylenol (0.4) | 12% | 0% | 92 | 1.18 | 200 | 500 | 61 | 1.19 |
| 2 | o-cresol (0.7) | 2,6-xylenol (0.3) | 20% | 10% | 94 | 1.19 | 199 | 530 | 64 | 1.18 |
| 3 | O-cresol (0.6) | 2-t-butyl-4-methylphenol (0.4) | 20% | 20% | 91 | 1.13 | 265 | 480 | 82 | 1.18 |
| 4 | o-cresol (0.8) | 2-t-butyl-4-methylphenol (0.2) | 45% | 20% | 94 | 1.18 | 230 | 520 | 78 | 1.19 |
| 5 | O-cresol (0.7) | 2,4-xylenol (0.3) | 20% | 15% | 100 | 1.18 | 203 | 550 | 76 | 1.19 |
| Comparative Example 1 | o-cresol (1.0) | Non | 100% | 100% | 98 | 1.19 | 196 | 680 | 67 | 1.21 |

EXAMPLES 6 AND 7

The glycidyl ether of novolak type substituted phenolic resin obtained in Examples 1 and 3 were mixed by rolling with additives according to the formulation shown in Table 2. The resulting compositions were compression molded under 70 kg/cm², at 160° C., and for 10 minutes, followed by post curing at 180° C. for 5 hours. The water absorption and volume resistivity of the molded specimens were measured. The results are shown in Table 2. (Water absorption was measured by weighing the specimens before and after dipping in pure water for 140 hours. Volume resistivity was measured before and after boiling for 140 hours.)

COMPARATIVE EXAMPLE 2

Cured moldings were prepared and measurements were carried out in the same way as in Examples 6 and 7 except that the glycidyl ether of o-cresol novolak obtained in Comparative Example 1 was used. The results are shown in Table 2. It is noted from Table 2 that when the monofunctional phenol contains hydrophobic substituent groups, the resulting glycidyl ether of novolak type substituted phenolic resin is low in water absorption and is also low in the decrease of volume resistivity.

TABLE 2

| Formulation | Example 6 | Example 7 | Comparative Example 2 |
|---|---|---|---|
| Glycidyl ether of novolak type substituted phenolic resin | Obtained in Example 1 | Obtained in Example 3 | Obtained in Comparative Exam- |

TABLE 2-continued

| Formulation | Example 6 | Example 7 | Comparative Example 2 |
|---|---|---|---|
| Quantity of above (g) | 100 | 100 | ple 1<br>100 |
| Phenol novolak* (g) | 56.1 | 42.3 | 56.6 |
| 2-phenyl-4-methyl-imidazole (g) | 2 | 2 | 2 |
| Fused silica (g) | 369 | 337 | 370 |
| Calcium stearate (g) | 1 | 1 | 1 |
| Physical properties | | | |
| Water absorption (%) | 0.80 | 0.62 | 0.84 |
| Volume resistivity (Ω-cm) | | | |
| Before boiling | $6.2 \times 10^{15}$ | $7.7 \times 10^{15}$ | $6.0 \times 10^{15}$ |
| After boiling (140 h) | $1.3 \times 10^{12}$ | $3.3 \times 10^{13}$ | $3.9 \times 10^{11}$ |

*The quantity of phenol novolak (curing agent) was adjusted according to the epoxy equivalent of the glycidyl ether of novolak type substituted phenolic resin, so that the number of moles of epoxy groups is equal to that of phenolic hydroxyl groups.

EXAMPLE 8

Glycidyl ether of novolak type substituted phenolic resin was produced from the novolak type phenolic resin synthesized in Example 1, using a 1-liter flask equipped with a thermometer, dropping funnel, stirrer, and separating tube with cooler. In the flask were placed 1.0 mol (as phenolic hydroxyl group) of novolak type phenolic resin, 7.0 mols of epichlorohydrin, and 0.4 times (by weight) as much dioxane as epichlorohydrin. Then, 48% NaOH (1.0 mol as NaOH) was added dropwise over 4 hours. During this time, epichlorohydrin, dioxane, and water were azeotropically boiled at 58° to 60° C. under reduced pressure (150 mmHg) and cooled in the separating tube, whereby the organic layer containing major amounts of epichlorohydrin and dioxane were returned to the reaction system whereas the water layer was discharged from the reaction system. After the reaction was completed, epichlorohydrin and dioxane were distilled away, and the reaction product was dissolved in methyl isobutyl ketone. Then the salt formed as a by-product was filtered out, and then methyl isobutyl ketone was distilled away. Thus, there was obtained a glycidyl ether of the novolak type substituted phenolic resin. This product was found to contain 0.029% (290 ppm) of hydrolyzable chlorine and to have an epoxy equivalent of 203, a softening point of 62° C., and a density of 1.19 g/cm³.

EXAMPLES 9 TO 12

Glycidyl ether of novolak type substituted phenolic resins were produced as in Example 8 from the novolak type phenolic resins synthesized in Examples 2 to 5. The quantity of epichlorohydrin, the number of moles of sodium hydroxide, and the kind and quantity of ether were changed as shown in Table 8. Also shown in Table 8 are the epoxy equivalent, content of hydrolyzable chlorine, softening point, and density of the glycidyl ether of novolak type substituted phenolic resin obtained.

TABLE 3

| Example No. | Quantity* of novolak type substituted resin (mol) | Epichlorohydrin (mol) | Sodium hydroxide (mol) | Kind of ether compound | Weight ratio of ether compound to epichlorohydrin | Pressure/temperature (mmHg/°C.) | Epoxy equivalent | Hydrolyzable chlorine (ppm) | Softening point (°C.) | Density (g/cm³) |
|---|---|---|---|---|---|---|---|---|---|---|
| 8 | 1.0 | 7 | 1.0 | Dioxane | 0.4 | 150/58–60 | 203 | 0.029 | 62 | 1.19 |
| 9 | 1.0 | 7 | 1.0 | Diethoxyethane | 0.3 | 150/58–60 | 205 | 0.031 | 66 | 1.18 |
| 10 | 1.0 | 6 | 1.0 | Dioxane | 0.3 | 150/58–60 | 272 | 0.025 | 84 | 1.18 |
| 11 | 1.0 | 6 | 1.0 | Dioxane | 0.5 | 150/58–60 | 230 | 0.027 | 79 | 1.19 |
| 12 | 1.0 | 7 | 1.0 | Dioxane | 0.5 | 150/58–60 | 206 | 0.030 | 79 | 1.19 |

*Number of moles of phenolic hydroxyl group.

While the invention has been described in detail and with reference to specific embodiment thereof, it will be apparent to one skilled in the art that various changes and modifications can be made therein without departing from the spirit and scope thereof.

What is claimed is:

1. A glycidyl ether of novolak type substituted phenolic resin having 1 to 40 repeating units on the number-average which comprises a substantially linear polymer composed of the repeating units represented by the formula (I):

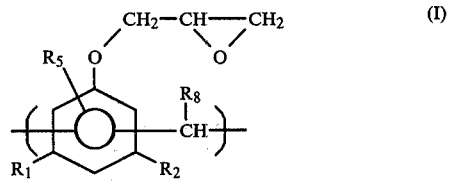

substantially all the terminals of the moleculer chains of said polymer being modified with a group represented by the formula (II):

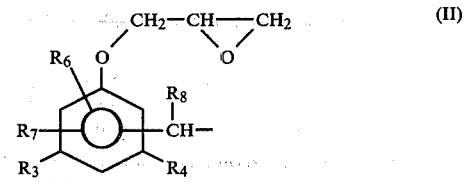

wherein $R_1$, $R_2$, $R_3$ and $R_4$, which may be the same or different, are members selected from the group consisting of hydrogen atom, alkyl groups having 1 to 8 carbon atoms, aromatic group, and halogen atom; $R_5$, $R_6$ and $R_7$, which may be the same or different, are members selected from the group consisting of alkyl groups having 1 to 10 carbon atoms, aromatic group, aryl group, and halogen atom; and $R_8$ is a member selected from the group consisting of hydrogen atom and alkyl groups having 1 to 4 carbon atoms.

2. A glycidyl ether of novolak type substituted phenolic resin as recited in claim 1, wherein $R_1$, $R_2$, $R_3$ and $R_4$, which may be the same or different, are members selected from the group consisting of hydrogen atom, methyl group, and halogen atom.

3. A glycidyl ether of novolak type substituted phenolic resin as recited in claim 1, wherein $R_5$, $R_6$ and $R_7$, which may be the same or different, are members selected from the group consisting of methyl group, butyl group, phenyl group, and halogen atom.

4. A glycidyl ether of novolak type substituted phenolic resin as recited in claim 1, wherein $R_8$ is a hydrogen atom.

5. A glycidyl ether of novolak type substituted phenolic resin as recited in claim 1, wherein $R_1$, $R_2$, $R_3$ and $R_4$ are hydrogen atoms.

6. A glycidyl ether of novolak type substituted phenolic resin as recited in claim 1, wherein $R_5$, $R_6$ and $R_7$, which may be the same or different, are members selected from the group consisting of methyl group and butyl group.

7. A glycidyl ether of novolak type substituted phenolic resin as recited in claim 1, wherein the number of the repeating units is 2 to 20 on the number-average.

8. A process for producing a glycidyl ether of novalak type substituted phenolic resin which comprises polycondensing 30 to 95 mol% of at least one difunctional phenol component represented by the formula (III):

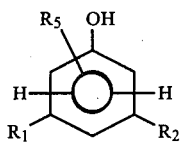

and 5 to 70 mol% of at least one monofunctional phenol represented by the formula (IV):

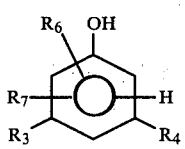

with an aldehyde represented by the formula (V):

$R_8CHO$     (V)

wherein $R_1$, $R_2$, $R_3$ and $R_4$, which may be the same or different, as members selected from the group consisting of hydrogen atom, alkyl groups having 1 to 8 carbon atoms, aromatic group, and halogen atom; $R_5$, $R_6$ and $R_7$, which may be the same or different, are members selected from the group consisting of alkyl groups having 1 to 10 carbon atoms, aromatic group, aryl group, and halogen atom; and $R_8$ is a member selected from the group consisting of hydrogen atom and alkyl groups having 1 to 4 carbon atoms to form a novolak type substituted phenolic resin and subsequently glycidyl etherifying the resin with an epihalohydrin.

9. A process as recited in claim 8, wherein the epihalohydrin is epichlorohydrin.

10. A process as recited in claim 8, wherein the difunctional phenol is p-propenylphenol, o-benzylphenol, 6-n-amyl-m-cresol, o-cresol, p-cresol, o-ethylphenol, p-ethylphenol, o-phenylphenol, p-phenylphenol, p-t-pentylphenol, p-t-butylphenol, o-chlorophenol, 4-chloro-3,5-xylenol, o-allylphenol, nonylphenol, or o-bromophenol.

11. A process as recited in claim 8, wherein the monofunctional phenol is 2-t-butyl-4-methylphenol, 2,4-xylenol, 2,6-xylenol, 2,4-dichlorophenol, 2,4-dibromophenol, dichloroxylenol, dibromoxylenol, 2,4,5-trichlorophenol, or 6-phenyl-2-chlorophenol.

12. A process as recited in claim 8, wherein the aldehyde is formaldehyde, paraformaldehyde, polyoxymethylene, or glyoxal.

13. A process as recited in claim 8, wherein the novolak type substituted phenol as recited in claim 8 is glycidyl etherified with an epihalohydrin in the presence of a cyclic or linear ether compound.

14. A process as recited in claim 13, wherein the cyclic or linear ether compound is dioxane or diethoxyethane.

15. An encapsulating compound comprising a glycidyl ether of novolak type substituted phenolic resin having 1 to 40 repeating units on the number-average which comprises a substantially linear polymer composed of the repeating units represented by the formula (I):

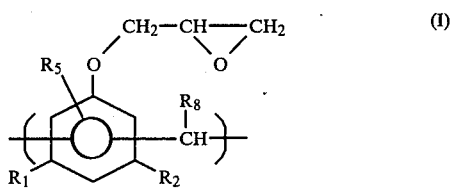

substantially all the terminals of the molecular chains of said polymer being modified with a group represented by the formula (II):

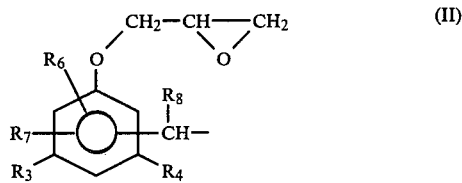

wherein $R_1$, $R_2$, $R_3$ and $R_4$, which may be the same or different, are members selected from the group consisting of hydrogen atom, alkyl groups having 1 to 8 carbon atoms, aromatic group, and halogen atom; $R_5$, $R_6$ and $R_7$, which may be the same or different, are members selected from the group consisting of alkyl groups having 1 to 10 carbon atoms, aromatic group, aryl group, and halogen atom; and $R_8$ is a member selected from the group consisting of hydrogen atom and alkyl groups having 1 to 4 carbon atoms.

* * * * *